United States Patent [19]

Hucks et al.

[11] 4,367,330

[45] Jan. 4, 1983

[54] PROCESS FOR THE PREPARATION OF AROMATIC POLYCARBONATES BY THE PHASE BOUNDARY PROCESS

[75] Inventors: Uwe Hucks, Alpen; Erhard Tresper, Krefeld, both of Fed. Rep. of Germany

[73] Assignee: Bayer Aktiengesellschaft, Leverkusen, Fed. Rep. of Germany

[21] Appl. No.: 187,666

[22] Filed: Sep. 16, 1980

[30] Foreign Application Priority Data

Sep. 20, 1979 [DE] Fed. Rep. of Germany ....... 2938109

[51] Int. Cl.$^3$ .............................................. C08G 63/62
[52] U.S. Cl. ..................................... 528/196; 528/200
[58] Field of Search ............................... 528/196, 200

[56] References Cited

U.S. PATENT DOCUMENTS

| | | | |
|---|---|---|---|
| 3,028,365 | 4/1962 | Schnell et al. | 260/47 |
| 3,035,020 | 5/1962 | Fry | 260/47 |
| 3,275,601 | 9/1956 | Schnell et al. | 260/47 |
| 3,530,094 | 9/1970 | Schnell et al. | 260/47 |
| 3,674,740 | 7/1972 | Vernaleken et al. | 260/47 |
| 3,879,348 | 4/1975 | Serini et al. | 260/47 |
| 3,912,687 | 10/1975 | Haupt et al. | 260/47 |
| 4,025,489 | 5/1977 | Bailey et al. | 260/47 |
| 4,038,252 | 7/1977 | Vernaleken et al. | 260/47 |

FOREIGN PATENT DOCUMENTS 54-97698  8/1979  Japan .

*Primary Examiner*—Harold D. Anderson
*Attorney, Agent, or Firm*—Gene Harsh; Lawrence S. Pope; Aron Preis

[57] ABSTRACT

The present invention relates to an improvement in the phase boundary polycondensation process for the preparation of aromatic, in particular thermoplastic, polycarbonates comprising carrying out the process in the presence of a saturated solution of alkali metal salts.

3 Claims, No Drawings

PROCESS FOR THE PREPARATION OF AROMATIC POLYCARBONATES BY THE PHASE BOUNDARY PROCESS

BRIEF DESCRIPTION OF THE INVENTION

The present invention relates to a process for the preparation of aromatic, in particular thermoplastic, polycarbonates by the phase boundary process, which is characterized in that the process is carried out in the presence of a saturated solution of alkali metal chloride, alkali metal carbonate, alkali metal phenolates and, if appropriate, alkali metal bicarbonate, preferably in the presence of NaCl, $Na_2CO_3$, sodium phenolates and, if appropriate, $NaHCO_3$.

DESCRIPTION OF THE PRIOR ART

Several variations of the phase boundary process for the preparation of aromatic, in particular thermoplastic, polycarbonates are known (see, for example, U.S. Pat. No. 3,028,365, U.S. Pat. No. 3,275,601, U.S. Pat. No. 3,530,094, German Offenlegungsschrift No. 1,920,302, German Offenlegungsschrift No. 2,063,050, German Offenlegungsschrift No. 2,315,888, German Offenlegungsschrift No. 2,408,068, German Offenlegungsschrift No. 2,410,716, German Offenlegungsschrift No. 2,602,366 and the "Schnell Monograph, Chemistry and Physics of Polycarbonates," Intersciences Publishers, 1964).

For the phase boundary process, there is on the one hand, the limiting case of the so-called suspension process, which is used if diphenols or diphenolates which are partly or completely insoluble in aqueous alkaline solution are present, and on the other hand, according to U.S. Pat. No. 3,035,020, the possibility of enriching the aqueous phase with inorganic salts before the start of the reaction in order to achieve better conversion. In the later case, reprecipitation of the solid salts during or upon the completion of the reaction is undesirable.

The object of the present invention is to isolate, in a simple manner, the quantities of alkali metal chloride, alkali metal carbonate and, if appropriate, alkali metal bicarbonate formed during the reaction of the phosgene or the chlorocarbonic acid ester with, for example, the alkali metal salts of the aromatic diphenols.

DETAILED DESCRIPTION OF THE INVENTION

Phenolates are to be understood as those of diphenols, monophenols and, if appropriate, polyphenols with more than two phenolic OH groups.

Saturated solutions in the context of the present invention can be of any of the states between the initial and final degrees of saturation at the start and at the end of the reaction, respectively. The initial saturation is to be understood as the equilibrium state, under the particular process conditions, between the salts, present in each case, in the solid form and in aqueous solution. This state of equilibrium is achieved by rendering alkaline the saturated aqueous solution of the inorganic salts by the addition of a concentrated sodium hydroxide solution in the amounts required in each case and adding in each case the required amounts of diphenols, monophenols and, if appropriate, polyphenols with more than two phenolic OH groups, in solid form. Final saturation is understood as the equilibrium state, under the particular process conditions which is established between inorganic salts present in the solid form and their saturated alkaline aqueous solution.

In a special case, the initial saturation can also be the equilibrium state, under the particular process conditions, which is achieved by not adding the saturated aqueous solution of the inorganic salts.

The quantities of alkali metal chloride, alkali metal carbonate and, if appropriate, alkali metal bicarbonate formed in the process according to the invention are separated off as solids and as saturated aqueous solutions. Such a successful method of carrying out the phase boundary process in the presence of or with the formation of a "third phase" consisting of inorganic salts was not obvious to the expert and was not to be expected.

The process according to the invention is carried out either continuously or discontinuously. The preferred process is a continuous one.

Both low-molecular and, preferably, high-molecular thermoplastic polycarbonates which have a set of properties similar to that of polycarbonates obtained by known two-phase boundary processes can be obtained by the process according to the invention.

Starting compounds for the preparation of the aromatic polycarbonates are any diphenols, but in particular, those of the following formula (I)

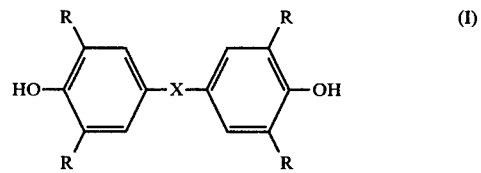

wherein
X is $C_1$–$C_6$-alkylene, $C_2$–$C_6$-alkylidene, $C_5$–$C_{15}$-cycloalkylene, $C_5$–$C_{15}$-cycloalkylidene, —S—, —O—, —$SO_2$— or a radical of the formula

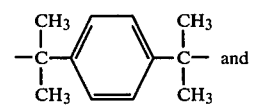

R is H, Cl, Br or $C_1$–$C_4$-alkyl.

Examples of suitable diphenols are 2,2-bis-(4-hydroxyphenyl)-propane (bisphenol A), 2,2-bis-(3,5-dichloro-4-hydroxyphenyl)-propane (tetrachlorobisphenol A), 2,2-bis-(3,5-dibromo-4-hydroxyphenyl)-propane (tetrabromobisphenol A), bis-(4-hydroxyphenyl) ether, 2,2-bis-(3,5-dimethyl-4-hydroxyphenyl)-propane (tetramethylbisphenol A), 1,1-bis-(4-hydroxyphenyl)-cyclohexane (bisphenol A), (bis-(4-hydroxyphenyl)-p-diisopropylbenzene (trinuclear bisphenol A), bis-(4-hydroxyphenyl) sulphide (thiobisphenol) and bis-(4-hydroxyphenyl)sulphone (sulphonylbisphenol).

The amount of phosgene required for the process according to the invention is between 1.05 and 1.80 mols, preferably between 1.10 and 1.30 mols, per mol of diphenol employed.

All or some of the amount of phosgene required can be replaced by equimolar amounts of bis-chlorocarbonic acid esters of the diphenols which are suitable according to the invention.

In general, up to 2.5 kg of a saturated solution of an alkali metal chloride, alkali metal carbonate and, if appropriate, alkali metal bicarbonate are employed per mol of diphenol used.

The chlorinated aliphatic or aromatic hydrocarbons customary as solvents for polycarbonates, such as, for example, $CH_2Cl_2$, 1,1-dichloroethane, chlorobenzene or chlorotoluenes, are employed for the organic phase in the process according to the invention. Mixtures of chlorobenzene and methylene chloride containing over 30% by weight of chlorobenzene, or pure chlorobenzene are preferably employed.

The amount of organic solvent is in each case chosen such that polycarbonate concentrations of between 3 and 30% by weight, preferably between 12 and 20% by weight, in each case relative to the total weight of organic phase, are obtained after the reaction.

The phase boundary process according to the invention is preferably carried out in two stages. The optimum OH concentration in the first stage is between 0.01 and 0.2% by weight and between 0.2 and 0.6% by weight in the second reaction stage. In both cases, the percentages are in relation to the weight of the aqueous phase.

The OH concentration results from the sum of dissociated alkali metal hydroxide and, if appropriate, undissociated alkali metal hydroxide in the aqueous phase.

In the discontinuous procedure, it is appropriate to monitor the alkalinity of the aqueous phase by measuring the pH. A pH value of about 10 to 14 is to be maintained in the first reaction stage (phosgenation stage), and a pH value of about 12 to 14 is to be maintained in the second reaction stage (polycondensation stage).

Particularly suitable catalysts for the process according to the invention are tertiary aliphatic amines, such as triethylamine and tributylamine, or cyclic aza compounds, such as N-alkyl-piperidines.

The amount of catalysts is between 0 and 10 mol%, relative to the mols of diphenol reacted, in the first reaction stage and between 0.05 and 10 mol%, relative to the mols of diphenol reacted, in the second reaction stage.

The addition of phosgene takes place exclusively in the first reaction stage, oligocarbonates being obtained. Polycondensation to high-molecular products and/or reaction of chlorocarbonic acid ester end groups present take place in the second reaction stage.

The reaction temperatures are between 0° C. and 95° C., preferably between 20° C. and 80° C. in both reaction stages and can be established independently of one another in the two stages. The process according to the invention can be carried out under normal or increased pressures of up to 50 bars. The pressures in the two reaction stages can be established independently of one another.

The residence time in the first reaction stage is from a few seconds to 30 minutes, preferably 30 seconds to 15 minutes; a residence time of from 1 to 60 minutes is to be maintained in the second stage.

Examples of suitable alkali metal hydroxides are LiOH, a NaOH and KOH, which are metered-in either in solid form or, preferably, as highly concentrated aqueous solutions.

Monofunctional compounds, in particular monophenols, are employed in the known molar amounts, relative to mols of diphenols, as chain regulators for establishing the molecular weight given below.

The polycarbonates obtainable according to the invention can also be branched by incorporation of small amounts, preferably between 0.05 and 2.0 mol%, relative to diphenols employed, of compounds which are trifunctional or more than trifunctional, in particular those with three or more phenolic hydroxyl groups. Polycarbonates of this type are described, for example, in German Offenlegungschriften Nos. 1,570,533, 2,113,347 and 2,500,092 and in U.S. Pat. No. Re. 27,682.

Examples of suitable branching agents are 1,4-bis-(4',4''-dihydroxytriphenylene)-methyl-benzene and 3,3-bis-(4-hydroxy-3-methyl-phenyl)-2-oxo-2,3-dihydroindole (isatinbis-o-cresol).

Aromatic polycarbonates with mean weight-average molecular weights between 2,500 and 200,000 (Mw determined by measuring the relative viscosity in $CH_2Cl_2$ at 25° C. and at a concentration of 0.005 g/cm$^3$) can be obtained by the process according to the invention.

After the reaction mixture has left the second reaction stage, the alkali metal chlorides, alkali metal carbonates and, if appropriate, alkali metal bicarbonates which have precipitated during the process are separated off by known industrial processes, such as rotary filters or trailing blade centrifuges, and are washed with the solvent used for the preparation of the polycarbonate.

The isolated salt mixture, consisting of alkali metal chloride, alkali metal carbonate and, if appropriate, alkali metal bicarbonate, can be converted quantitatively into the alkali metal chloride by treating with hydrochloric acid and the alkali metal chloride can be used, for example, for alkali metal chloride electrolysis.

After the reaction mixture has left the second reaction stage, some of the aqueous phase present as the saturated salt solution is also discharged, separation from the organic phase being effected by the customary methods known for the preparation of polycarbonates by the two-phase boundary process.

In general, about 65% by weight of the mixture of about 0.54 kg of NaCl and about 0.07 kg of $Na_2CO_3$ formed per kg of bisphenol A polycarbonate are separated off as a solid, and the remainder is discharged as a saturated salt solution.

The saturated salt solutions are converted into pure alkali metal chloride solutions, for example by treatment with hydrochloric acid, and these can be used for the production of chlorine and, for example, sodium hydroxide via alkali metal chloride electrolysis.

The organic phase which has been freed from the aqueous phase and contains the polycarbonate formed is purified by known methods and the polycarbonate is isolated by known methods.

The polycarbonates obtainable by the process according to the invention can be processed into shaped articles in a known manner and in the case of low molecular products, can be used, for example, as additives for modifying high-molecular polycarbonates.

The polycarbonates obtainable according to the invention can be modified by the addition of fillers or stabilizers, as required for the particular application.

EXAMPLE 1 (A Discontinuous Procedure)

68.4 g of bisphenol A are suspended in 340 g of concentrated sodium chloride solution with 1.26 g of p-tert.-butylphenol in a three-necked flask with a stirrer, dropping funnel, thermomometer, and gas inlet and outlet tubes. After during 48 g of 50% strength sodium hydroxide solution and 500 ml of methylene chloride, 36 g of phosgene are passed in during a period of 20 minutes. The pH value is kept at about 13 by simultaneously adding sodium hydroxide solution. After the introduction of the phosgene, 4 ml of a 4% strength aqueous triethylamine solution are added and the mixture is subsequently stirred for 45 minutes at pH 13–14; additional sodium hydroxide solution is added if appropriate. After separating off the solid alkali metal salts, these are washed with methylene chloride. The phases of the filtrate are separated. No bisphenol can be detected in the aqueous phase. The salts dissolve quantitatively in water containing hydrochloric acid.

The organic phase, together with the wash solution from the salts, is washed once with a dilute phosphoric acid and then with water until free from electrolytes. After evaporating off the methylene chloride, 74.6 g of polycarbonate are obtained.

The characteristic data are:
relative viscosity (0.005 g/cm$^3$ in methylene chloride): 1.321
saponifiable chlorine [ppm]: 3
—OH end groups [%]: 0.016

EXAMPLE 2 (A Ccontinuous Procedure)

The following suspensions and solutions are pumped into a stirred kettle which can optionally be cooled:

1. 60.8 kg/hour of a suspension of bisphenol A in a saturated salt solution having the following composition: 91.2 kg of bisphenol A, 450 kg of saturated salt solution (aqueous phase from the reaction, aqueous solution taken from the previous reaction medium which is part of the two phase boundary reaction mixture consisting of an aqueous part and of an organic solvent part e.g. CH$_2$Cl$_2$- part of chloro-benzene part, salts: sodium chloride/Na$_2$CO$_3$ and, if appropriate, NaHCO$_3$), 64 kg of 50% strength sodium hydroxide solution, 0.05 kg of sodium borohydride and 1.9 kg of p-tert.-butylphenol;

2. 4.71 kg/hour of phosgene with 78 kg/hour of a solvent mixture consisting of 55 parts of methylene chloride and 45 parts of chlorobenzene; and 3. 3.6 kg/hour of 50% strength sodium hydroxide solution.

The reaction temperature is 34° C. and the concentration of OH in the aqueous reaction phase is 0.13%. The average residence time is 12 minutes.

1.5 kg of a 2% strength solution of triethylamine in chlorobenzene, and further sodium hydroxide solution to increase the OH concentration to 0.25–0.35%, are added to the reaction mixture flowing out of the reactor. Further condensation of the oligocarbonate is carried out in a cascade of 3 stirred kettles. The average residence time is 24 minutes and the temperature is 34°–36° C.

After separating off the precipitated salts by centrifugation, 0.29% of OH is found in the aqueous reaction phase. Bisphenol A cannot be detected.

The salt (about 6 kg) which has been washed with a solvent mixture of methylene chloride and chlorobenzene dissolves quantitatively in water containing hydrochloric acid. The conversion of bisphenol A is accordingly quantitative.

The polycarbonate solution is washed by known processes until free from electrolytes and the polycarbonate is isolated.

The characteristic data for the isolated polycarbonate are:
relative viscosity (0.005 g/cm$^3$ in methylene chloride): 1.287
saponifiable chlorine [ppm]: 2
—OH end groups [%]: 0.011
p-tert.-butylphenyl end groups [%]: 1.79
inorganic chlorine [ppm]: 2
$M_n$: 15,700
$M_w$: 29,500
heterogeneity: 0.88
color number[X]: 0.25

[X] The polycarbonate color number is an empirical relative characteristic. This is defined as follows: 0.05 unit is a photometrically distinguishable graduation of a test rod 4 mm thick, viewed against the light.

EXAMPLE 3 (A Continuous Procedure)

The following suspensions and solutions are pumped into a reactor:

1. 91.2 kg/hour of a suspension of bisphenol A in a saturated salt solution, with the following composition: 91.2 kg of bisphenol A, 450 kg of saturated salt solution (aqueous phase from the reaction, salts: sodium chloride/Na$_2$CO$_3$ and, if appropriate, NaHCO$_3$), 65 kg of 50% strength sodium hydroxide solution, 0.05 kg of sodium borohydride, 1.9 kg of p-tert.-butylphenol and 0.303 kg of triethylamine;

2. 6.77 kg/hour of phosgene with 72 kg/hour of chlorobenzene; and 3. 0.9 kg/hour of 50% strength sodium hydroxide solution.

The reaction temperature is 71° C., the concentration of OH in the aqueous reaction phase is 0.03% and the average residence time is 1.3 minutes.

Further sodium hydroxide solution is added to the reaction mixture flowing out of the reactor in order to increase the OH concentration to 0.20–0.30%. Further condensation is carried out in a cascade of 3 stirred kettles. The average residence time is 21 minutes and the temperature is 74° C.

The salts which have precipitated are separated off by centrifugation. The aqueous phase contains 0.26% of OH. Bisphenol cannot be detected.

The salts, washed with chlorobenzene, dissolve completely in water containing hydrochloric acid. The conversion is quantitative.

The polycarbonate solution is washed by known processes until free from electrolytes and the polycarbonate is isolated.

The polycarbonate has the following characteristic analytical data:
relative viscosity (0.005 g/cm$^3$ in methylene chloride): 1.274
saponifiable chlorine [ppm]: <2
—OH end groups [%]: 0.019
p-tert.butylphenyl end groups [%]: 1.77
inorganic chlorine [ppm]: <2
$M_n$: 14,300
$M_w$: 28,200
heterogeneity: 0.97
color number: 0.1

What is claimed is:

1. In the process for the preparation of an aromatic, thermoplastic polycarbonate from at least one diphenol reactant, at least one monophenol reactant and phosgene reactant, in the presence of at least one chlorinated aliphatic or aromatic hydrocarbon solvent, at least one catalyst and at least one alkali hydroxide at reaction temperatures between 0° C. and 95° C., the improvement comprising introducing into said reaction a saturated aqueous solution of at least one member selected from the group consisting of NaCl, Na$_2$CO$_3$, sodium phenolate and NaHCO$_3$, causing precipitation and recovering of any of the solid alkali metal chloride, alkali metal carbonate and alkali metal bicarbonate formed during the reaction.

2. The process of claim 1 wherein said phase boundary process is continuous.

3. The process of claim 1 wherein said saturated solution is employed at a ratio of up to 2.5 Kgs of said solution per each mol of diphenol.

* * * * *